WILLIAM J. PERKINS.
Improvement in Derricks.
No. 126,484.            Patented May 7, 1872.
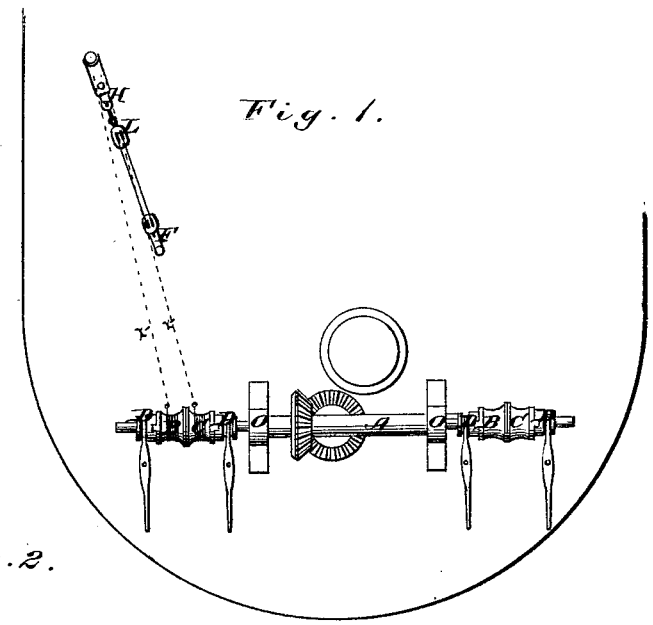
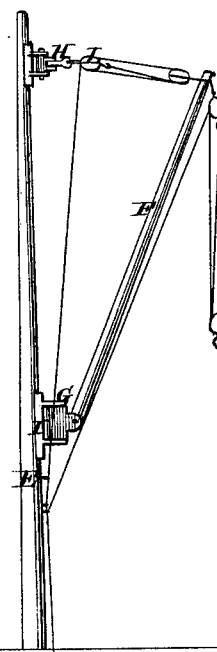
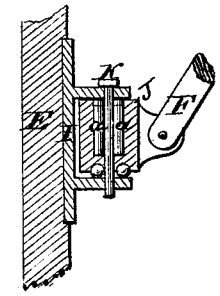
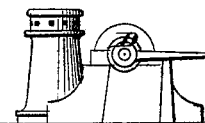

126,484

UNITED STATES PATENT OFFICE.

WILLIAM J. PERKINS, OF LOUISVILLE, KENTUCKY.

IMPROVEMENT IN DERRICKS.

Specification forming part of Letters Patent No. 126,484, dated May 7, 1872.

*To all whom it may concern:*

Be it known that I, WILLIAM JONES PERKINS, of Louisville, Jefferson county, State of Kentucky, have made certain new and useful Improvements in Derricks, of which the following is a full description, reference being had to the accompanying drawing and to the letters of reference marked thereon.

This invention has for its object the production of a derrick which shall be simple in its construction and very effective in its operation; and consists mainly in an improved joint for uniting the gaff and the mast, as will be fully described hereinafter.

In the drawing, Figure 1 represents a top view of the derrick, and the shaft and pulleys employed for operating its ropes. Fig. 2 represents a side elevation of the same; and Fig. 3, a sectional elevation of the improved joint.

A represents a shaft resting in proper bearing O, which shaft is provided at each end with loose pulleys B C and clutches D. *x x* represent the ropes in dotted lines running to the derrick. E represents the mast or standard; F, the gaff; G, the improved joint at the foot of the gaff; and H, the joint at the top of the mast. The improved joint is shown in section in Fig. 3. I represents a saddle, securely fastened in any proper manner. Between the projections of the saddle I is located a casting, J, having friction-rollers *a a* and friction-balls, as shown. The casting J is provided with ears for holding the foot of the gaff, and it is secured in place by the pin K, about which it revolves. The joint H is similar in its construction, but is provided with means for attaching to itself the block L, as shown. The joint furnishes a bearing that is almost frictionless, and consequently the gaff is easily moved in any desired direction.

Having thus fully described my invention, what I claim as new, and desire to secure by Letters Patent, is—

1. The joint described, consisting of the saddle I, casting J, friction balls and rollers *a a*, and bolt K, the rollers *a a* being located in a recess in the casting, as set forth.

2. The combination of the joints G H, constructed as described, with mast E, gaff F, blocks, pulleys, and ropes, as set forth.

W. J. PERKINS.

Witnesses:
 EDWARD H. HYDE,
 JOHN P. JONES.